(12) United States Patent
Knapp et al.

(10) Patent No.: US 12,484,876 B2
(45) Date of Patent: Dec. 2, 2025

(54) REGISTRATION SYSTEM FOR CARDIAC ULTRASOUND

(71) Applicant: FUJIFILM SONOSITE, INC., Bothell, WA (US)

(72) Inventors: David Knapp, Bellevue, WA (US); Ryan Hebbler, Metairie, LA (US); Andrew Lundberg, Woodinville, WA (US); Davin Dhatt, Woodinville, WA (US)

(73) Assignee: FUJIFILM SONOSITE, INC., Bothell, WA (US)

( * ) Notice: Subject to any disclaimer, the term of this patent is extended or adjusted under 35 U.S.C. 154(b) by 60 days.

(21) Appl. No.: 18/344,402

(22) Filed: Jun. 29, 2023

(65) Prior Publication Data

US 2025/0000482 A1   Jan. 2, 2025

(51) Int. Cl.
*A61B 8/08* (2006.01)
*A61B 8/00* (2006.01)

(52) U.S. Cl.
CPC .......... *A61B 8/0841* (2013.01); *A61B 8/0883* (2013.01); *A61B 8/4254* (2013.01); *A61B 8/462* (2013.01); *A61B 8/466* (2013.01); *A61B 8/483* (2013.01)

(58) Field of Classification Search
CPC ... A61B 8/0841; A61B 8/0883; A61B 8/4254; A61B 8/462; A61B 8/466; A61B 8/483
See application file for complete search history.

(56) References Cited

U.S. PATENT DOCUMENTS

| | | | | |
|---|---|---|---|---|
| 11,497,563 B2* | 11/2022 | Erkamp | ........... | A61B 8/467 |
| 12,178,604 B2* | 12/2024 | Werneth | ........... | A61B 8/565 |
| 2012/0143029 A1* | 6/2012 | Silverstein | ........... | A61B 8/0891 |
| | | | | 600/374 |
| 2013/0197357 A1* | 8/2013 | Green | ........... | A61B 90/361 |
| | | | | 600/424 |

(Continued)

OTHER PUBLICATIONS

Hongjie Hu et al., "A wearable cardiac ultrasound imager", Nature, vol. 613, 1 Jan. 26, 2023, pp. 667-675, https://doi.org/10.1038/s41586-022-05498-z, published online Jan. 25, 2023, 9 pages.

*Primary Examiner* — Adil Partap S Virk
(74) *Attorney, Agent, or Firm* — Womble Bond Dickinson (US) LLP

(57) ABSTRACT

An ultrasound system includes an ultrasound scanner, a patient-worn registration system configured in at least a one-way communication with an interventional instrument, and a processor system. The processor system is configured to determine, based on the ultrasound data and positional data of the ultrasound scanner, a first location of the patient anatomy relative to the patient-worn registration system, determine, based on the at least a one-way communication, a second location of the interventional instrument relative to the patient-worn registration system; and determine, based on the first location and the second location, a third location of the interventional instrument relative to the patient anatomy. The processor system is configured to display a depiction of the patient anatomy based on the ultrasound data and a visual representation of the interventional instrument at the third location on a display device.

14 Claims, 11 Drawing Sheets

(56) References Cited

U.S. PATENT DOCUMENTS

| | | | |
|---|---|---|---|
| 2014/0243641 A1* | 8/2014 | Boveja | A61B 6/5247 600/374 |
| 2019/0307419 A1* | 10/2019 | Durfee | A61B 8/5246 |
| 2022/0226046 A1* | 7/2022 | Mariappan | A61B 18/1492 |
| 2024/0206848 A1* | 6/2024 | Xu | A61B 8/5207 |
| 2024/0335215 A1* | 10/2024 | Aliakbari | A61B 8/462 |

* cited by examiner

500

With an ultrasound scanner, transmit ultrasound at a patient anatomy and generate ultrasound data based on reflections of the ultrasound from the patient anatomy
502

Determine, based on the ultrasound data and positional data of the ultrasound scanner, a first location of the patient anatomy relative to a patient-worn registration system that is in at least a one-way communication with an interventional instrument
504

Determine, based on the at least a one-way communication, a second location of the interventional instrument relative to the patient-worn registration system
506

Determine, based on the first location and the second location, a third location of the interventional instrument relative to the patient anatomy
508

Display, with a display device a depiction of the patient anatomy based on the ultrasound data and a visual representation of the interventional instrument at the third location
510

With an ultrasound scanner, transmit ultrasound at a patient anatomy and generate ultrasound data based on reflections of the ultrasound from the patient anatomy
802

↓

Determine, based on the ultrasound data and positional data of the ultrasound scanner, a location of the patient anatomy in a coordinate system
804

↓

Determine a location of an interventional instrument in the coordinate system
806

↓

Determine, based on the location of the patient anatomy in the coordinate system and the location of the interventional instrument in the coordinate system, a location of the interventional instrument relative to the patient anatomy
808

↓

Display, with a display device a depiction of the patient anatomy based on the ultrasound data and a visual representation of the interventional instrument at the location relative to the patient anatomy
810

FIG. 8

REGISTRATION SYSTEM FOR CARDIAC ULTRASOUND

Embodiments disclosed herein relate to ultrasound systems. More specifically, embodiments disclosed herein relate to a registration system for a cardiac ultrasound.

BACKGROUND

Ultrasound systems can generate ultrasound images by transmitting sound waves at frequencies above the audible spectrum into a body, receiving echo signals caused by the sound waves reflecting from internal body parts, and converting the echo signals into electrical signals for image generation. Because they are non-invasive, ultrasound systems are often used to assist in medical procedures.

One example of a medical procedure that can use an ultrasound system is the insertion of a peripherally inserted central catheter (PICC) into a patient's heart. A PICC includes a long, thin tube (or line) that is usually inserted into a patient's vein in their arm. The PICC is then passed through the vein to the heart, with final placement at the junction of the superior vena cava and the right atrium. An ultrasound system is often used to visualize the PICC line as it is inserted into the vein and passes through the vein. For example, see the Bard SiteRite 8 system.

To assist the clinician in placing the tip of the PICC at the desired location, e.g., at the junction of the superior vena cava and the right atrium, the Bard SiteRite 8 system relies on electrocardiogram (ECG) signals rather than visualization via ultrasound. For instance, when the tip of the PICC is extended beyond the junction of the superior vena cava and the right atrium, the ECG signal usually displays premature ventricular contractions, thus alerting the clinician to "back-off" the placement of the PICC by retracting it. This procedure can thus cause damage to the patient's heart if the PICC is inserted too far. Further, since every person's anatomy is different, the PICC can miss the heart entirely, and instead go up through the patient's neck, causing discomfort and potential harm. Accordingly, conventional systems may not be suitable for PICC insertion into the heart, and can cause damage to a patient. Hence, patients may not receive the best care possible with conventional systems.

SUMMARY

Systems and methods related to a registration system for a cardiac ultrasound are described. In some embodiments, an ultrasound system includes an ultrasound scanner configured to transmit ultrasound at a patient anatomy and generate ultrasound data based on reflections of the ultrasound from the patient anatomy. The ultrasound system includes a patient-worn registration system configured in at least a one-way communication with an interventional instrument. The ultrasound system also includes a processor system implemented to determine, based on the ultrasound data and positional data of the ultrasound scanner, a first location of the patient anatomy relative to the patient-worn registration system, determine, based on the at least a one-way communication, a second location of the interventional instrument relative to the patient-worn registration system, and determine a third location of the interventional instrument relative to the patient anatomy based on the first location and the second location. The ultrasound system further includes a display device configured to display a depiction of the patient anatomy based on the ultrasound data and a visual representation of the interventional instrument at the third location.

In some other embodiments, an ultrasound registration system includes a chest-worn device configured to locate an interventional instrument. The ultrasound registration system also includes a processor system implemented to determine, based on the chest-worn device and ultrasound data from an ultrasound scanner, a location of a patient anatomy relative to the chest-worn device, determine a location of the interventional instrument relative to the patient anatomy based on the location of the patient anatomy and the location the interventional instrument, generate a three-dimensional (3D) depiction of the patient anatomy based on the ultrasound data; and cause display of the 3D depiction and a visual representation of the interventional instrument at the location relative to the patient anatomy.

In yet some other embodiments, an ultrasound registration system includes a chest-worn device configured to locate a peripherally inserted central catheter (PICC) using at least one magnetic sensor. The ultrasound registration system also includes a processor system implemented to determine, based on the chest-worn device and ultrasound data from an ultrasound scanner, a location of a cardiac anatomy relative to the chest-worn device, determine a location of the PICC relative to the cardiac anatomy based on the location of the cardiac anatomy and said locate the PICC, generate, based on the ultrasound data and the location of the PICC relative to the cardiac anatomy, a combination of a depiction of the cardiac anatomy and a visual representation of the PICC, and cause display of an image that includes the combination.

Other systems, devices, and methods related to a registration system for a cardiac ultrasound are also described.

BRIEF DESCRIPTION OF THE DRAWINGS

The appended drawings illustrate examples and are, therefore, exemplary embodiments and not considered to be limiting in scope.

FIG. 5 illustrates an example method that can be implemented by an ultrasound system according to some embodiments.

FIG. 8 illustrates an example method that can be implemented by an ultrasound system according to some embodiments.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Conventional ultrasound systems may not be suitable for peripherally inserted central catheter (PICC) insertion, and can result in damage to a patient. Hence, patients may not receive the best care possible with conventional ultrasound systems. Accordingly, systems, devices, and techniques are disclosed herein that include a wearable registration system (e.g., a patient-worn registration system) that is affixed to a patient, such as over their chest. The ultrasound system can image a cardiac anatomy and determine the anatomy's location relative to the wearable registration system. The ultrasound system can also determine the location of the PICC catheter tip relative to the wearable registration system, e.g., via sensors in the wearable registration system. By combining these data sets, the ultrasound system can determine the relative positions of the catheter tip to the cardiac anatomy, and place suitable representations of both in an augmented reality (AR) environment. Because the wearable registration system remains fixed on the patient, the system does not require real-time, three-dimensional (3D) cardiac ultrasound (i.e., 4D data). Rather, the system can generate suitable 3D cardiac data before commencing the procedure, and use this 3D data during the procedure. Further, the wearable registration system can be acoustically transparent, so that an ultrasound scanner can be placed over the wearable registration system to transmit and receive ultrasound through the wearable registration system. In some embodiments, the wearable registration includes at least one device, such as one or more ECG leads, defibrillator pads, a wearable cardiac ultrasound imager, and/or a display device.

Figure 1A:
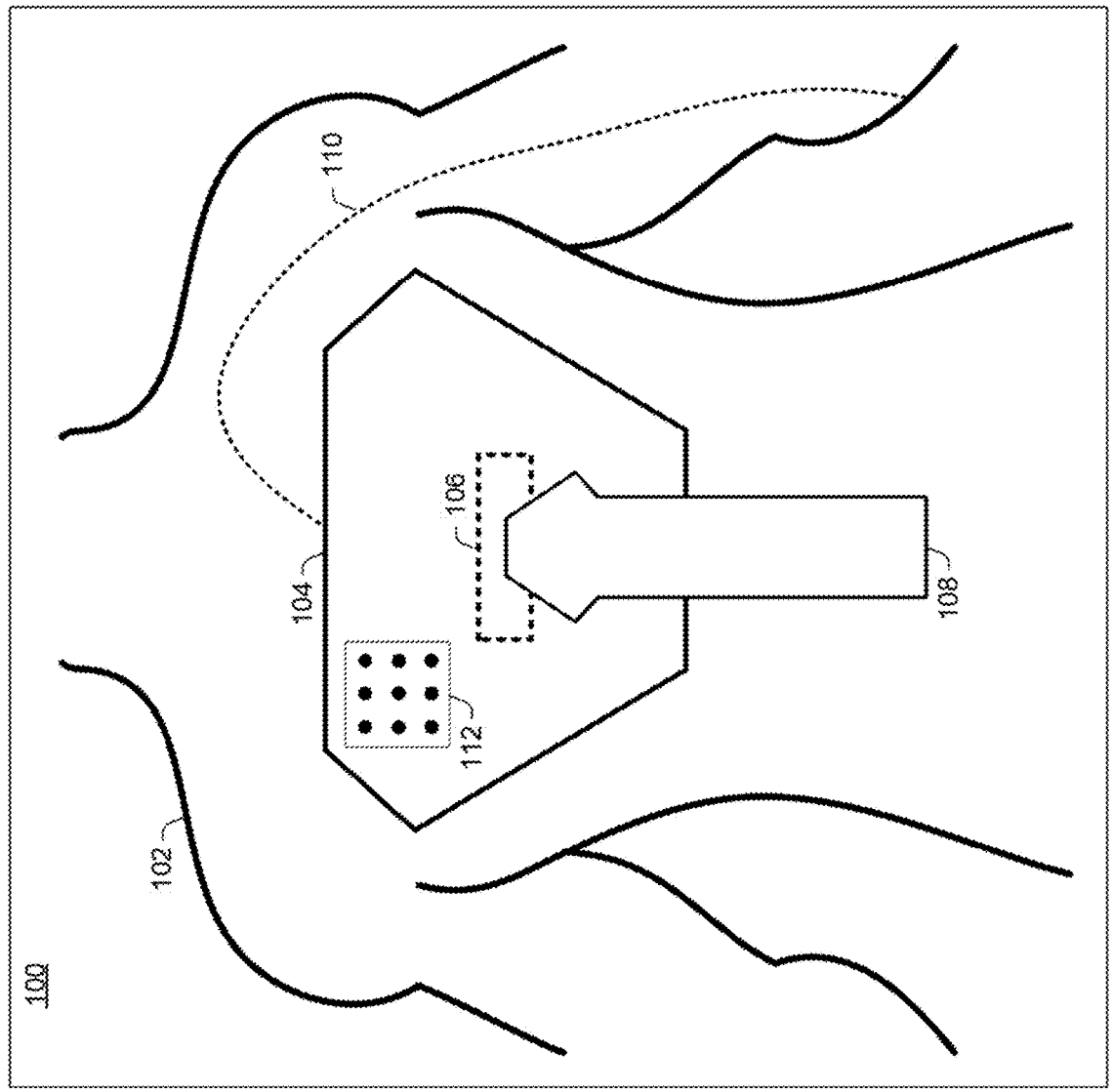
FIG. 1A is a view illustrating a patient and a patient-worn registration system according to some embodiments.

FIG. 1A is a view 100 illustrating a patient 102 and a patient-worn registration system 104 according to some embodiments. The patient-worn registration system 104 can be attached to the chest of the patient 102, such as with a bonding agent (e.g., glue or double-sided tape) along the perimeter of the patient-worn registration system 104, so that it is static with respect to the patient 102. Further, the patient-worn registration system 104 can be of any suitable shape, and is not limited to the example illustrated in FIG. 1A. In some embodiments, the patient-worn registration system 104 includes one or more windows 106 that can be "holes" in the patient-worn registration system 104 through which an ultrasound scanner 108 can transmit ultrasound and receive ultrasound reflections from an anatomy of the patient 102. In some embodiments, the one or more windows 106 include an acoustically transparent material through which the ultrasound scanner 108 can transmit ultrasound and receive the ultrasound reflections. In the example in FIG. 1A, one window 106 is illustrated. However, the patient-worn registration system 104 is not so limited and can include any suitable number of windows 106 that are arranged in any suitable pattern, such as in horizontal or vertical rows or strips.

Additionally or alternatively to the one or more windows 106, the patient-worn registration system 104 can itself be substantially comprised of an acoustically transparent material. Hence, the ultrasound scanner 108 can be placed over substantially any portion of the patient-worn registration system 104 to transmit ultrasound and receive the ultrasound reflections. Examples of an acoustically transparent material include cotton sheer muslin, linen cyclorama fabric, canvas, and burlap. In some embodiments, an acoustically transparent material does not attenuate ultrasound, or attenuates the ultrasound below an acceptable threshold, such as no more than 1.0 dB. In some embodiments, at least part of the patient-worn registration system 104 is comprised of Tegaderm™.

FIG. 1A also illustrates the PICC line 110 inserted through a vein near the patient's 102 elbow. The PICC line 110 is passed towards the patient's 102 neck and down towards the heart. In an example, the patient-worn registration system 104 is chest-worn (e.g., affixed to the patient's 102 chest), and not the patient's 102 arm. Hence, in some embodiments, the patient-worn registration system 104 can be used to guide the PICC placement into the patient's 102 heart, and not assist in guiding the PICC line 110 through the patient's 102 arm. Further, the PICC line 110 is merely one example of an interventional instrument that can be guided using the patient-worn registration system 104. Other examples of an interventional instrument include a pacemaker and a stent that can be placed into the patient's 102 heart anatomy using the patient-worn registration system 104.

The patient-worn registration system 104 can include signal sources and/or sensors, and the interventional instrument (e.g., the tip of the PICC) can also include signal sources and/or sensors. Hence, the patient-worn registration system 104 and the interventional instrument can be in communication with one another, allowing the ultrasound system to determine a location of the interventional instrument relative to the patient-worn registration system 104. The signal sources and sensors can use any suitable means of communication, such as a magnetic field, radio frequency waves, etc. Hence, the communication between the patient-worn registration system 104 and the interventional instrument can be at least a one-way communication. For instance, the patient-worn registration system 104 can include a signal source comprised of a magnet, and the interventional instrument can include a sensor to read the magnetic field from the magnet. Additionally or alternatively, the patient-worn registration system 104 can include an RF sensor configured to read an RF wave emitted by an RF source of the interventional instrument.

In embodiments, the ultrasound scanner 108 includes an inertial measurement unit (IMU) that can determine orientation data (e.g., a location and orientation of the ultrasound scanner), such as in a coordinate system of the patient-worn registration system 104. An IMU can include a combination of accelerometers, gyroscopes, and magnetometers, and generate location and/or orientation data including data representing six degrees of freedom (6DOF), such as yaw, pitch, and roll angles in a coordinate system. Typically, 6DOF refers to the freedom of movement of a body in three-dimensional space. For example, the body is free to change position as forward/backward (surge), up/down (heave), left/right (sway) translation in three perpendicular axes, combined with changes in orientation through rotation about three perpendicular axes, often termed yaw (normal axis), pitch (transverse axis), and roll (longitudinal axis). Additionally or alternatively, the ultrasound system can include a camera to determine location and/or orientation data for the ultrasound scanner 108. Based on orientation data of the ultrasound scanner (e.g., from the IMU), the ultrasound system can determine positional data of the ultrasound scanner 108 that describes at least a location of the ultrasound scanner 108 relative to the patient-worn registration system 104.

Additionally or alternatively, the ultrasound system can determine positional data of the ultrasound scanner 108 using fiducial markers 112 of the patient-worn registration system 104. The fiducial markers 112 can be placed in or on any suitable portion of the patient-worn registration system 104, and are illustrated in only a rectangular portion of the patient-worn registration system 104 in FIG. 1A for clarity. The fiducial markers 112 can be made of a material that is detectable by ultrasound, such as metal spheres, a wire mesh, and the like. Hence, as the ultrasound scanner 108 is moved about the patient-worn registration system 104, the ultrasound system can determine orientation data of the ultrasound scanner based on ultrasound transmitted and received by the ultrasound scanner 108, and the interaction of the ultrasound data with the fiducial markers 112 of the patient-worn registration system 104. The ultrasound system can thus determine the positional data of the ultrasound scanner 108 that describes at least a location of the ultrasound scanner relative to the patient-worn registration system 104.

Using the ultrasound data generated by the ultrasound scanner 108 that images the patient anatomy, along with the location of the ultrasound scanner 108 relative to the patient-worn registration system 104, the ultrasound system can then determine a location of the patient anatomy relative to the patient-worn registration system 104. The ultrasound system can combine the location of the patient anatomy relative to the patient-worn registration system 104 with the location of the interventional instrument relative to the patient-worn registration system 104. Based on the combination of these data sets, the ultrasound system can determine a location of the interventional instrument relative to the patient anatomy. In some embodiments, the disclosed techniques create a full service PICC team ultrasound system. In some embodiments, the disclosed techniques provide contextual visualization of a catheter's current location within the body. In some embodiments, the disclosed techniques provide contextual visualization of catheter and actual heart anatomy for proper placement. In some embodiments, the disclosed techniques provide an optimal integration of ultrasound and technology with an AR.

Figure 1B:
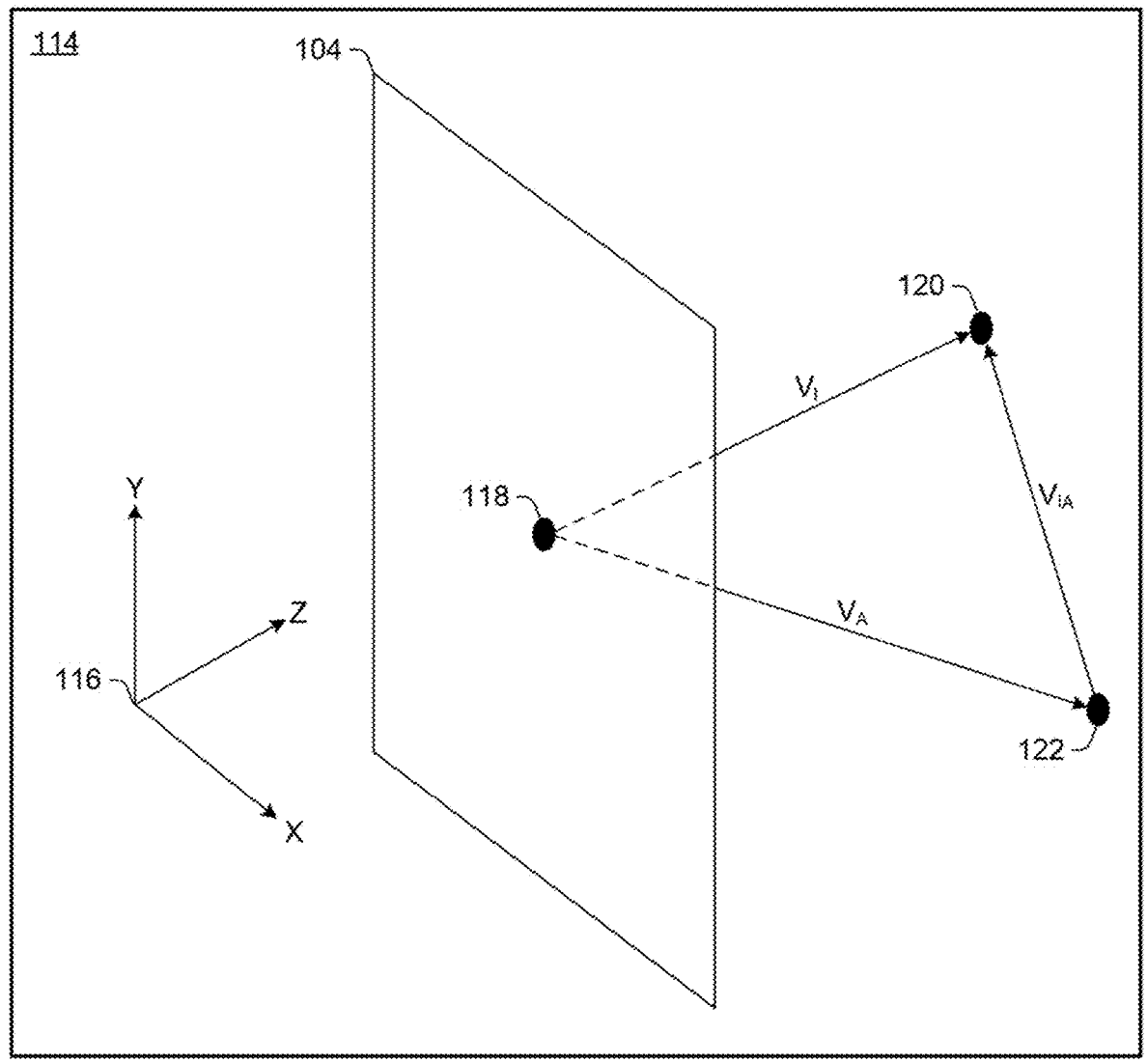
FIG. 1B is a view illustrating a geometry to determine relative locations of an interventional instrument and a patient anatomy according to some embodiments.

FIG. 1B is a view illustrating a geometry 114 to determine relative locations of an interventional instrument and a patient anatomy according to some embodiments. The geometry 114 illustrates the patient-worn registration system 104 as a plane (e.g., a plane parallel to a surface that touches the patient's 102 chest in FIG. 1), and includes a coordinate system 116 of the patient-worn registration system 104. The geometry 114 also includes a plurality of reference points, for example, a reference point 118 of the patient-worn registration system 104. The reference point 118 can be any suitable point on the patient-worn registration system 104, such as its center. The geometry 114 also includes one or more points of an interventional instrument, such as a point 120. The geometry 114 also includes one or more points of a patient anatomy, such as a point 122. The vector $V_A$ describes the location of the point 122 of the patient anatomy from the reference point 118 in the coordinate system 116, and the vector $V_I$ describes the location of the point 120 of the interventional instrument from the reference point 118 in the coordinate system 116. The vector $V_{IA}$ describing the location of the interventional instrument relative to the patient anatomy can be determined from the vectors $V_A$ and $V_I$ as $V_{IA}=V_I-V_A$.

In some embodiments, the ultrasound system can determine an orientation (e.g., rotation about one or more axes) of the interventional instrument and/or patient anatomy by determining multiple points similar to the points 120 and 122 for these objects. In some embodiments, for each of the multiple points, the ultrasound system can determine vectors similar to the vector $V_{IA}$ that describe the positional relationships of the objects. Hence, a "location" of an object can include its position as well as orientation.

Returning to FIG. 1A, based on the ultrasound data generated by the ultrasound scanner 108, the ultrasound system can generate a depiction of the patient anatomy (e.g., a 3D depiction). The ultrasound system can also generate a visual representation of the interventional instrument, such as an icon, and display the depiction of the patient anatomy together with the visual representation of the interventional instrument in the same frame of reference. For instance, the visual representation of the interventional instrument can be displayed at the proper location relative to the patient anatomy, based on the combination of data sets described above. In some embodiments, the ultrasound system displays the depiction of the patient anatomy together with the visual representation of the interventional instrument in an augmented reality (AR) environment. For instance, an operator of the ultrasound system can wear a pair of glasses or goggles, or a suitable heads-up display, to display the depiction of the patient anatomy together with the visual representation of the interventional instrument. Additionally or alternatively, the patient-worn registration system 104 can include a display device implemented to display the depiction of the patient anatomy together with the visual representation of the interventional instrument.

Figure 2:
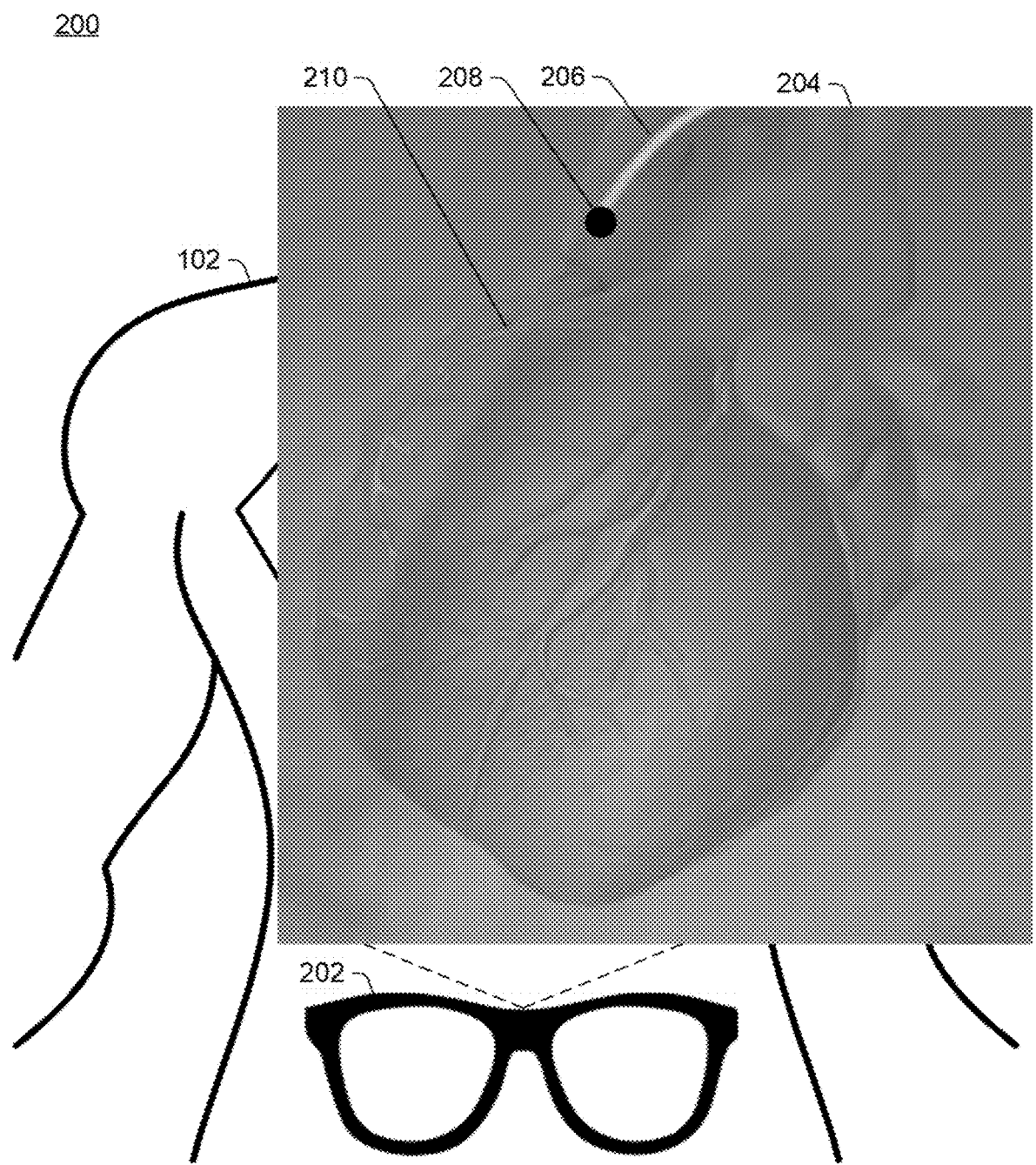
FIG. 2 illustrates an augmented reality environment according to some embodiments.

FIG. 2 illustrates an augmented reality environment 200 according to some embodiments. The augmented reality environment 200 can be viewed through a pair of glasses 202, such as smart glasses, while a wearer of the glasses 202 gazes at the patient 102. The augmented reality environment 200 includes a synthetic image 204 (e.g., a computer-generated image) that depicts a visual representation of an interventional instrument 206 and its tip 208, along with a depiction of the patient anatomy 210 (e.g., cardiac anatomy). The location and orientation of the interventional instrument 206 relative to the patient anatomy 210 is determined by the ultrasound system, as described above. The synthetic image 204 is overlaid over the patient 102. Hence, a clinician can wear the glasses 202 to depict the augmented reality environment 200, that includes a view of the patient 102 together with the synthetic image 204 to assist the clinician as they insert the interventional instrument 206 into the patient anatomy 210.

In some embodiments, the ultrasound system generates a 3D depiction of the patient anatomy prior to insertion of the interventional instrument into the patient anatomy. The 3D depiction is then displayed during the insertion of the interventional instrument into the patient anatomy. Hence, the 3D depiction can be static (e.g., not generated in real-time). This feat is possible because the patient-worn registration system used to determine the relative positional relationships of the patient anatomy and interventional instrument remains fixed to the patient during the insertion of the interventional instrument into the patient anatomy. Generally, this is simply not possible using conventional systems that are not fixed relative to the patient, such as cameras and sensors placed throughout an examination room. Instead, these conventional systems can require the use of real-time 3D ultrasound (i.e., 4D ultrasound), which can be difficult and expensive to operate, and may not yield acceptable imaging results. Thus, the insertion of the interventional instrument into the patient anatomy with conventional systems can result in errors and less than the best care possible for the patient.

Figure 3:
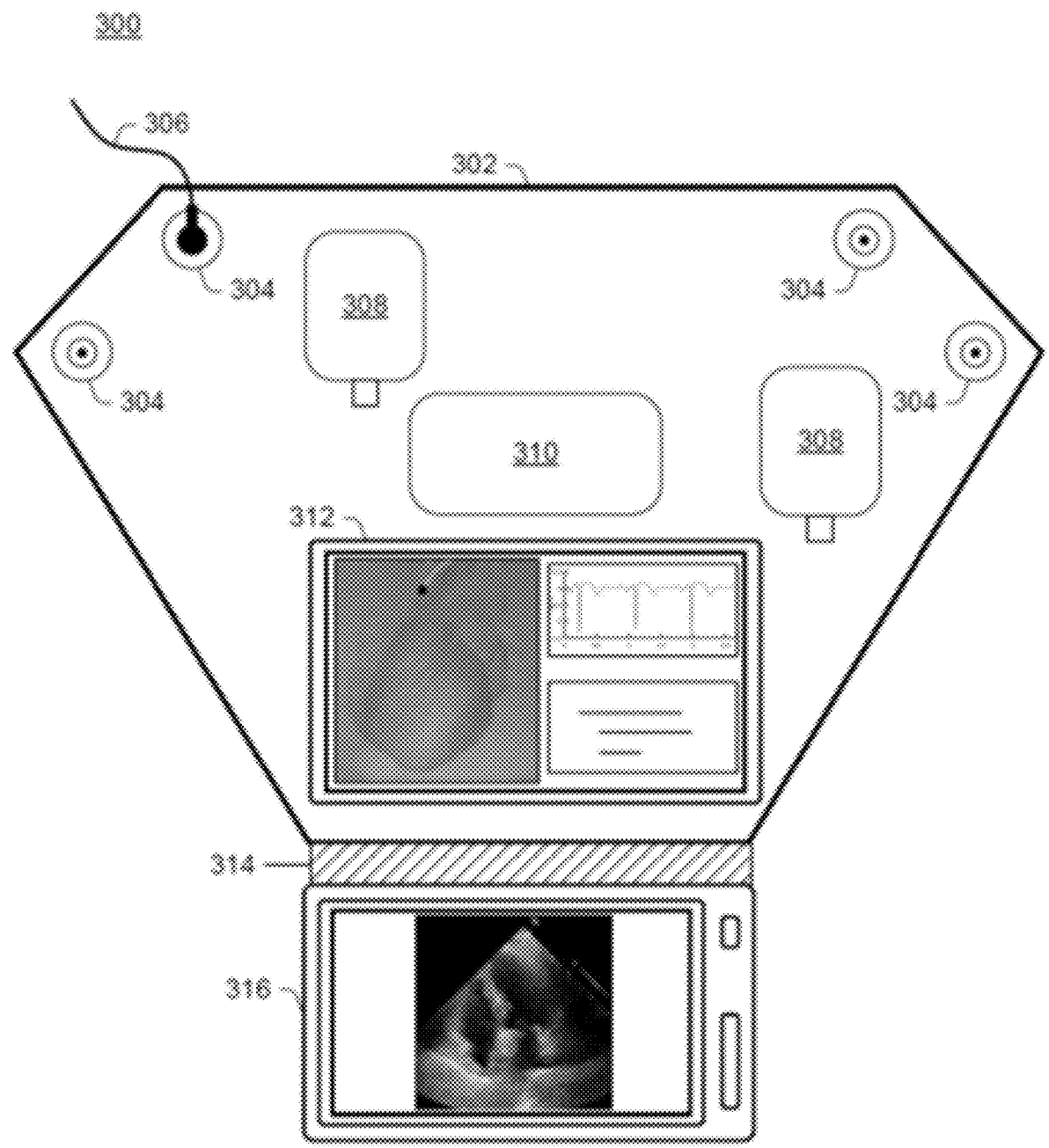
FIG. 3 is a view illustrating an example of a patient-worn registration system according to some embodiments.

FIG. 3 is a view 300 illustrating an example of a patient-worn registration system 302 according to some embodiments. The patient-worn registration system 302 can include any suitable devices, or mechanisms to mount a suitable device. For instance, the patient-worn registration system 302 in FIG. 3 includes ECG sensors 304. For clarity, only one of the ECG sensors 304 has an ECG lead 306 connected to it. The ECG sensors 304 can be connected to an ECG module (not shown) that generates ECG signals, which can be displayed on a display device (discussed below in more detail).

The patient-worn registration system 302 also includes one or more defibrillator pads 308. A defibrillator device (not shown) can be connected to the defibrillator pads 308 to send an electric pulse or shock to the patient's heart to restore a normal heartbeat.

The patient-worn registration system 302 also includes a cardiac ultrasound imager 310, such as that described in "A wearable cardiac ultrasound imager" by Hu et al. in Nature, volume 613, pages 667-675 (2023). The cardiac ultrasound imager 310 can be placed over a patient anatomy area and used during a procedure, such as the insertion of an interventional instrument into a patient anatomy (e.g., the insertion of a PICC into a heart). Hence, a display device of an ultrasound system (e.g., the display device 312 or the display device 316) can display live ultrasound images to assist with the insertion of the interventional instrument into the patient anatomy.

The patient-worn registration system 302 also includes a display device 312 that can display any suitable information to assist in a medical procedure, such as insertion of a PICC into a heart. In some embodiments, the display device 312 is implemented to display a depiction of a patient anatomy together with a visual representation of the interventional instrument in the same frame of reference, as previously described. Hence, the display device 312 can display a 3D cardiac image that is static and was generated prior to the insertion of the interventional instrument into the heart, as previously described.

Additionally or alternatively, the display device 312 can display an ECG waveform, e.g., a waveform generated through the use of ECG sensors 304. Additionally or alternatively, the display device 312 can display ultrasound device data, such as values of imaging parameters (e.g., gain, depth, beamform parameters, etc.), a model number of an ultrasound scanner, and the like. Additionally or alternatively, the display device 312 can display a live ultrasound image generated by the cardiac ultrasound imager 310, to depict the interventional instrument as it is inserted into a patient's heart.

The patient-worn registration system 302 can also include a connector 314 that can couple a display device 316 to the patient-worn registration system 302. For instance, the display device 316 can include a smartphone or any suitable display device that can display any suitable information, including information that can be displayed by the display device 312. In some embodiments, the display device 316 displays an ultrasound image, such as a B-mode image that is generated based on ultrasound data from the cardiac ultrasound imager 310. For instance, the cardiac ultrasound imager 310 can be operated during a procedure that inserts an interventional instrument into a patient anatomy, to further provide imaging information to the operator during the insertion. In contrast, the ultrasound scanner 108 can be operated prior to the insertion of the interventional instrument to generate the (static 3D) depiction of the patient anatomy that is subsequently displayed during the insertion.

The connector 314 can include a mechanical connector to mount or secure the display device 316 to the patient-worn registration system 302. Additionally or alternatively, the connector 314 can include an electrical connector configured to electronically couple the display device 316 to the patient-worn registration system 302. The electronic coupling can implement a communication link between the display device 316 and the patient-worn registration system 302. In some embodiments, the electronic coupling includes a power connection, so that power can be supplied from the display device 316 to the patient-worn registration system 302 and/or from the patient-worn registration system 302 to the display device 316.

Example System

Figure 4:
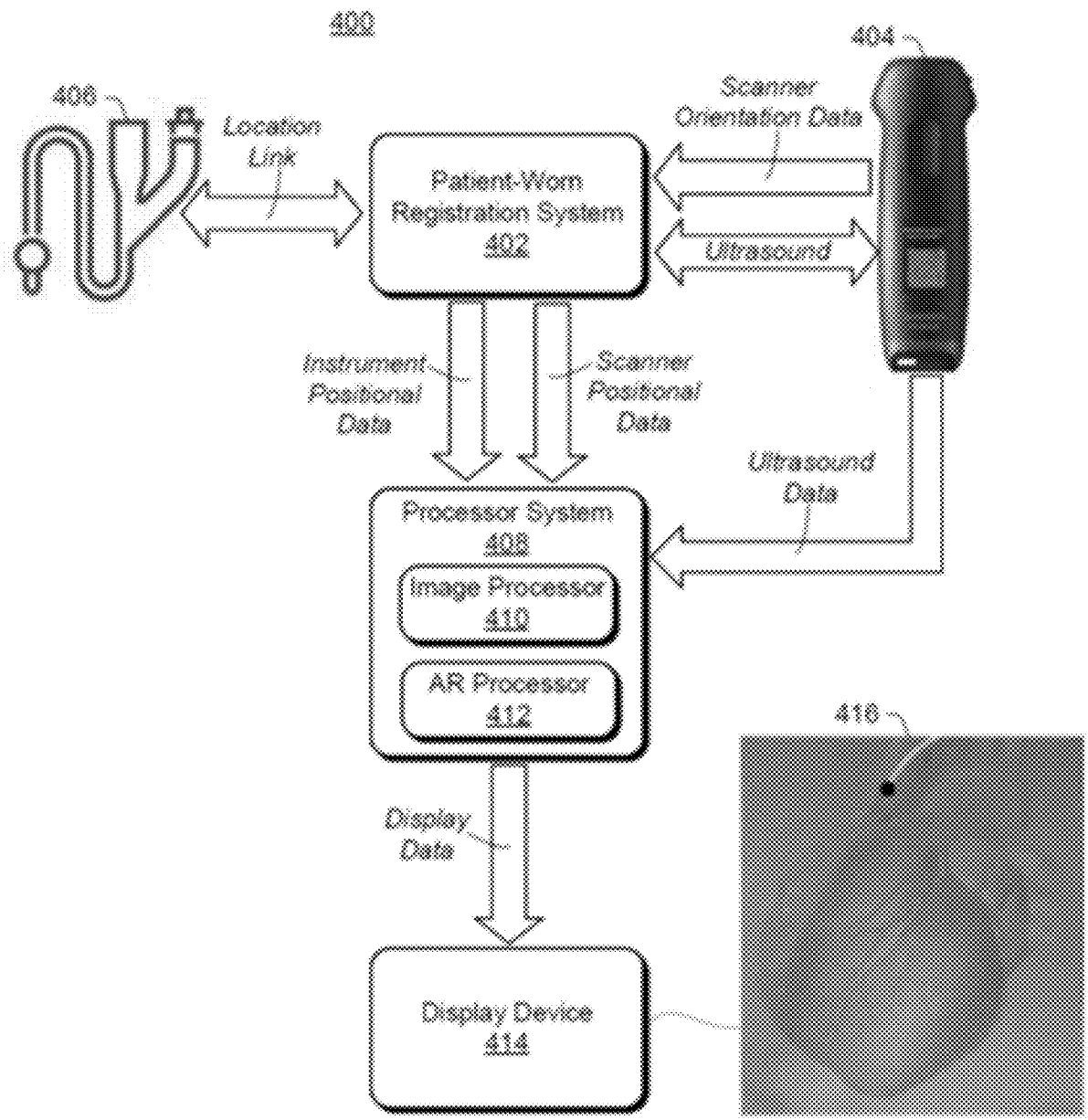
FIG. 4 is a view of an ultrasound system in accordance with some embodiments.

FIG. 4 is a view of an ultrasound system 400 in accordance with some embodiments. The ultrasound system 400 includes a patient-worn registration system 402. The patient-worn registration systems 104 and 302 described above are examples of the patient-worn registration system 402. The ultrasound system 400 also includes an ultrasound scanner 404. In some embodiments, the ultrasound scanner 404 transmits ultrasound through the patient-worn registration system 402, and receives, through the patient-worn registration system 402, reflections of the ultrasound from a patient anatomy. For instance, the patient-worn registration system 402 can be comprised of an acoustically transparent material. Additionally or alternatively, the patient-worn registration system 402 can include one or more windows (e.g., the window 106 described above) through which ultrasound can pass unattenuated. Based on the reflections of the ultrasound, the ultrasound scanner 404 generates ultrasound data that can be used by the processor system 408 to generate display data.

The ultrasound scanner 404 also provides scanner orientation data to the patient-worn registration system 402. The scanner orientation data describes an orientation and/or location of the ultrasound scanner 404, and can be based on an IMU of the ultrasound scanner 404 and/or fiducial markers of the patient-worn registration system 402, as previously described. Based on the scanner orientation data, the patient-worn registration system 402 provides scanner positional data to the processor system 408. In some embodiments the scanner positional data describes at least a location of the ultrasound scanner 404 relative to the patient-worn registration system 402.

The ultrasound system 400 also includes an interventional instrument 406, illustrated in FIG. 4 as a catheter for exemplary purposes. In some embodiments, the patient-worn registration system 402 and the interventional instrument 406 are in at least a one-way communication with each other over a location link. One example of a location link includes a magnetic link in which one of the patient-worn registration system 402 and the interventional instrument 406 includes a magnetic source and the other of the patient-worn registration system 402 and the interventional instrument 406 includes a magnetic sensor implemented to read a magnetic field emanated from the magnetic source. Based on the data determined from the location link, the patient-worn registration system 402 provides instrument positional data to the processor system 408. The instrument positional data describes at least a location of the interventional instrument 406 relative to the patient-worn registration system 402.

The processor system 408 receives the ultrasound data from the ultrasound scanner 404, and the scanner positional data and the instrument positional data from the patient-worn registration system 402. Based on the instrument positional data, the processor system 408 determines a location of the interventional instrument 406 relative to the patient-worn registration system 402, such as in a coordinate system of the patient-worn registration system 402. Based on the ultrasound data and the scanner positional data, the processor system 408 determines a location of the patient anatomy relative to the patient-worn registration system 408, such as in the coordinate system of the patient-worn registration system 402. The processor system 408 can then combine the location of the interventional instrument 406 relative to the patient-worn registration system 402 and the location of the patient anatomy relative to the patient-worn registration system 408 to generate a location of the interventional instrument 406 relative to the patient anatomy.

The processor system 408 can include any suitable type and number of processors. In an example, the processor system 408 includes one or more processors. In the example illustrated in FIG. 4, the processor system 408 includes an image processor 410 and an augmented reality (AR) processor 412. The image processor 410 can be configured to generate display data for images that can be displayed on a screen of a display device 414, including ultrasound images and depictions of a patient anatomy. The AR processor 412 can be configured to generate display data for images that can be displayed in an augmented reality environment by a display device. In some embodiments, the AR processor 412 generates icons of an AR object and overlays the icons on an image generated in accordance with the display data generated by the image processor 410. Hence, the image processor 410 and the AR processor 412 can work in conjunction with one another to generate display data for an image displayed by a display device. The display data can include a visual representation of the interventional instrument 406 and a depiction of a patient anatomy, as described above. In some embodiments, the depiction of the patient anatomy includes a 3D depiction of a heart based on the ultrasound data generated by the ultrasound scanner 404.

The display device 414 receives the display data from the processor system 408 and generates a displayable image in any suitable format. In some embodiments, the display device displays an image in an augmented reality environment. For example, the image 416 generated by the display device 414 can be superimposed over the image of a patient in an augmented reality environment. The glasses 202 and the display devices 312 and 316 described above are examples of the display device 414. In some embodiments, the image 416 including at least a tip of the interventional instrument (e.g., a catheter) is superimposed (including Z axis for depth) over the body to aid in detecting if the tip of the interventional instrument is on a proper path, or if it has veered off the proper path. In some embodiments, the image 416 including at least a tip of the interventional instrument is superimposed (including Z axis for depth) over the body and integrated with a 3D ultrasound view of the patient's anatomy (e.g., heart, lung, kidney, or other patient's anatomy) to help identify the desired end point and ensure that the interventional instrument is inserted to a predetermined depth into the patient's anatomy, is not inserted to the depth greater than the predetermined depth, and/or is not inserted to the depth that is smaller than the predetermined depth.

Procedures

FIG. 5 illustrates an example method 500 that can be implemented by an ultrasound system according to some embodiments. The ultrasound system can include an ultrasound scanner, a patient-worn registration system, a processor system, and a display device. Operations of the method are performed by processing logic that can comprise hardware (circuitry, dedicated logic, etc.), software (such as is run on a general-purpose computer system or a dedicated machine), firmware, or combinations thereof.

The ultrasound scanner transmits ultrasound at a patient anatomy and generates ultrasound data based on reflections of the ultrasound from the patient anatomy (block 502). The processor system determines, based on the ultrasound data and positional data of the ultrasound scanner, a first location of the patient anatomy relative to the patient-worn registration system that is in at least a one-way communication with an interventional instrument (block 504). The processor system determines, based on the at least a one-way communication, a second location of the interventional instrument relative to the patient-worn registration system (block 506). The processor system determines, based on the first location and the second location, a third location of the interventional instrument relative to the patient anatomy (block 508). The display device displays a depiction of the patient anatomy based on the ultrasound data and a visual representation of the interventional instrument at the third location (block 510).

In some embodiments, the processor system generates the depiction of the patient anatomy as a three-dimensional (3D) depiction, and the display device displays the 3D depiction and the visual representation as part of an augmented reality environment. The patient anatomy can include a cardiac anatomy and the processor system can generate the 3D depiction as a static cardiac depiction that is generated prior to insertion of the interventional instrument into the cardiac anatomy. The interventional instrument can include at least one of a catheter, a pacemaker, and a stent.

In some embodiments, the patient-worn registration system includes a chest-worn patch. The chest-worn patch can be acoustically transparent, and the ultrasound scanner can transmit the ultrasound through the chest-worn patch. Further, the chest-worn patch can include at least one device selected from the group consisting of ECG sensors, defibrillator pads, and the display device. Additionally or alternatively, the chest-worn patch can include a cardiac ultrasound imager configured to generate additional ultrasound data while the interventional instrument is inserted into the patient anatomy, and the display device can display one or more images that depict the insertion.

In some embodiments, the patient-worn registration system includes at least one sensor and the interventional instrument includes at least one signal source. Additionally or alternatively, the patient-worn registration system can include at least one signal source and the interventional instrument includes at least one sensor. The at least a one-way communication can include a communication from the at least one signal source to the at least one sensor.

In some embodiments, the ultrasound scanner includes an inertial measurement unit implemented to generate orientation data for the ultrasound scanner. The positional data of the ultrasound scanner can be based on the orientation data, and describes a location of the ultrasound scanner relative to the patient-worn registration system. Additionally or alternatively, the patient-worn registration system can include ultrasound-detectable fiducial markers, and the processor system can generate, based on the ultrasound transmitted by the ultrasound scanner and the ultrasound-detectable fiducial devices, orientation data for the ultrasound scanner. The positional data of the ultrasound scanner can be based on the orientation data and describes a location of the ultrasound scanner relative to the patient-worn registration system.

Figure 6:
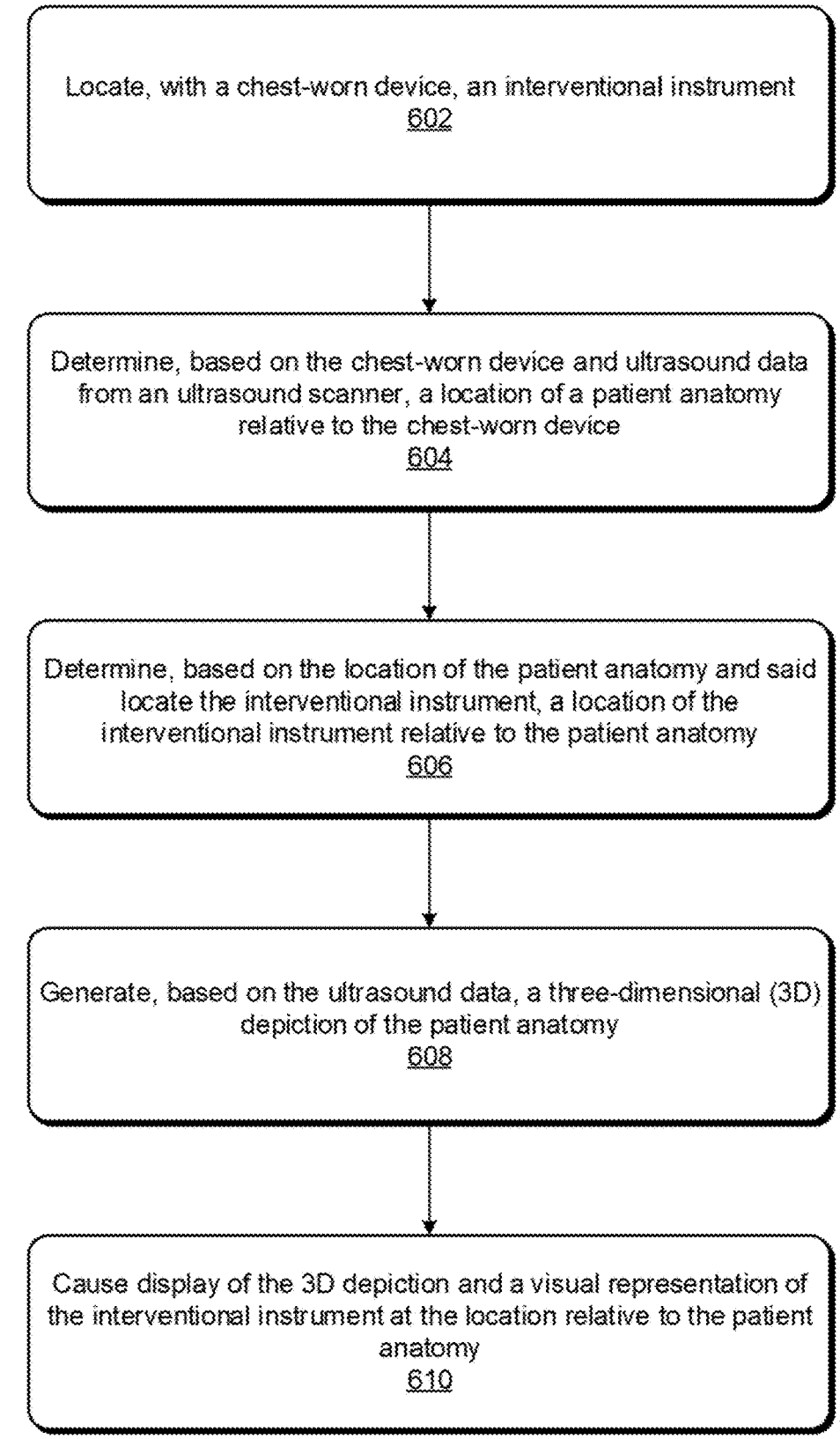
FIG. 6 illustrates an example method that can be implemented by an ultrasound registration system according to some embodiments.

FIG. 6 illustrates an example method 600 that can be implemented by an ultrasound registration system according to some embodiments. The ultrasound registration system can include a chest-worn device and a processor system. Operations of the method are performed by processing logic that can comprise hardware (circuitry, dedicated logic, etc.), software (such as is run on a general-purpose computer system or a dedicated machine), firmware, or combinations thereof.

The chest-worn device locates the interventional instrument (block 602). The processor system determines, based on the chest-worn device and ultrasound data from an ultrasound scanner, a location of a patient anatomy relative to the chest-worn device (block 604). The processor system determines, based on the location of the patient anatomy and the locating of the interventional instrument by the chest-worn device, a location of the interventional instrument relative to the patient anatomy (block 606). The processor system generates, based on the ultrasound data, a three-dimensional (3D) depiction of the patient anatomy (block 608). The processor system causes display of the 3D depiction and a visual representation of the interventional instrument at the location relative to the patient anatomy (block 610).

In some embodiments, the chest-worn device is acoustically transparent and the ultrasound scanner is implemented to transmit ultrasound through the chest-worn device to generate the ultrasound data. In embodiments, the chest-worn device includes a display device implemented to display the 3D depiction of the patient anatomy and the visual representation of the interventional instrument. Additionally or alternatively, the display indicates a depth of the interventional instrument from the chest-worn device.

In some embodiments, as the interventional instrument is inserted into the patient anatomy, the ultrasound scanner is implemented to generate additional ultrasound data, and the processor system is implemented to update the 3D depiction and the display of the 3D depiction based on the additional ultrasound data.

In some embodiments, prior to insertion of the interventional instrument into the patient anatomy, the ultrasound scanner is implemented to generate the ultrasound data, and the processor system is implemented to generate the 3D depiction.

In some embodiments, the patient anatomy includes a heart, and the interventional instrument includes a peripherally inserted central catheter (PICC). The visual representation can include a tip of the PICC and at least a portion of a line of the PICC.

Figure 7:
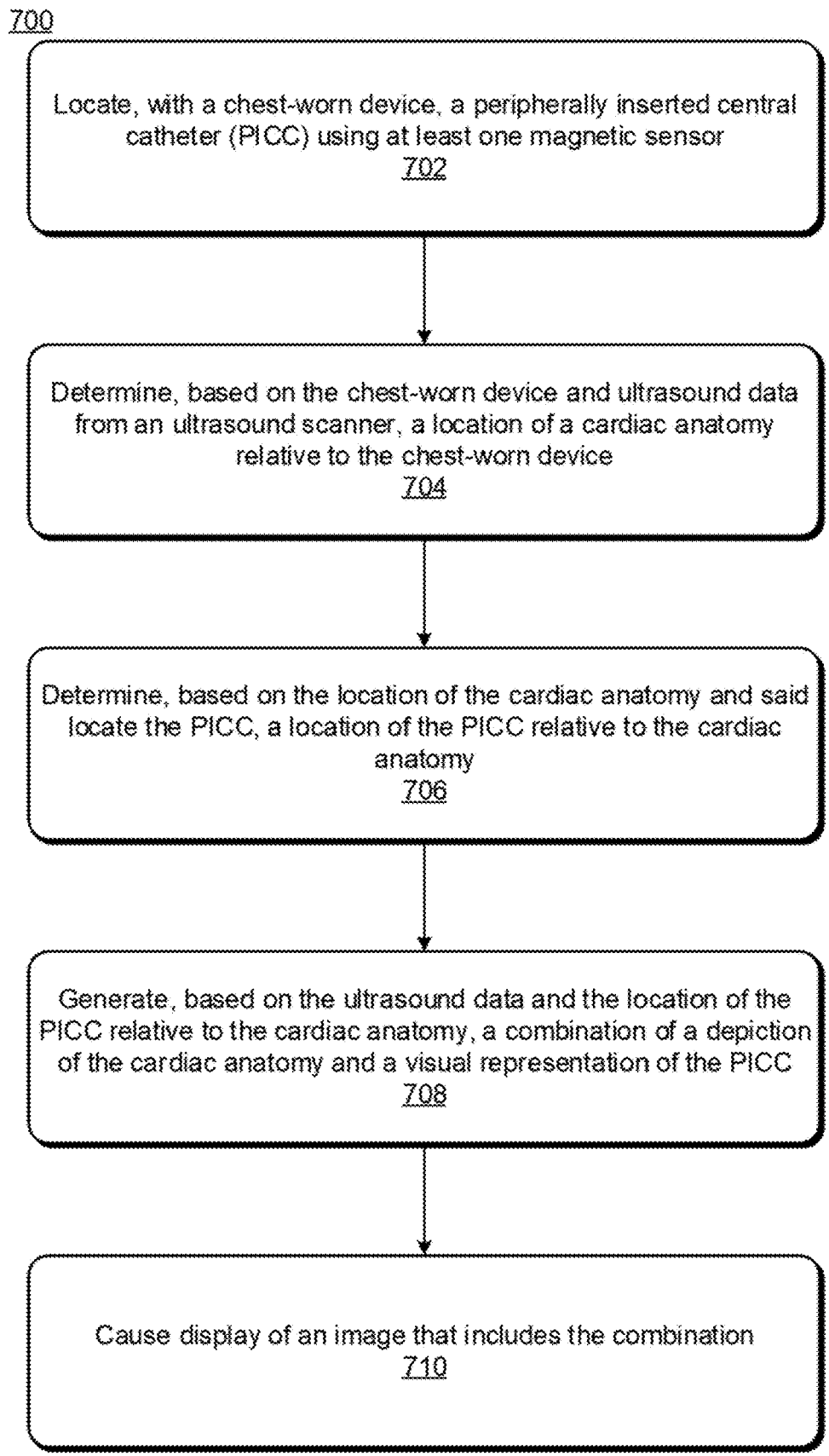
FIG. 7 illustrates an example method that can be implemented by an ultrasound registration system according to some embodiments.

FIG. 7 illustrates an example method 700 that can be implemented by an ultrasound registration system according to some embodiments. The ultrasound registration system can include a chest-worn device and a processor system. Operations of the method are performed by processing logic that can comprise hardware (circuitry, dedicated logic, etc.), software (such as is run on a general-purpose computer system or a dedicated machine), firmware, or combinations thereof.

The chest-worn device locates a peripherally inserted central catheter (PICC) using at least one magnetic sensor (block 702). The processor system determines, based on the chest-worn device and ultrasound data from an ultrasound scanner, a location of a cardiac anatomy relative to the chest-worn device (block 704). The processor system determines, based on the location of the cardiac anatomy and locates the PICC, a location of the PICC relative to the cardiac anatomy (block 706). The processor system generates, based on the ultrasound data and the location of the PICC relative to the cardiac anatomy, a combination of a depiction of the cardiac anatomy and a visual representation of the PICC (block 708). The processor system causes display of an image that includes the combination (block 710).

In some embodiments, the processor system generates the depiction of the cardiac anatomy as a three-dimensional (3D) depiction, and displays the 3D depiction and the visual representation of the PICC as part of an augmented reality environment. The processor system can generate the 3D depiction as a static cardiac depiction that is generated prior to insertion of the PICC into the cardiac anatomy. The chest-worn device can be acoustically transparent, and the ultrasound scanner can transmit the ultrasound through the chest-worn device. Further, the chest-worn device can include at least one device selected from the group consisting of ECG sensors, defibrillator pads, and the display device. Additionally or alternatively, the chest-worn device can include a cardiac ultrasound imager configured to generate additional ultrasound data while the PICC is inserted into the cardiac anatomy, and the display device can display one or more images that depict the insertion.

In some embodiments, the chest-worn device includes at least one sensor and the PICC includes at least one signal source. Additionally or alternatively, the chest-worn device can include at least one signal source and the PICC includes at least one sensor. The chest-worn device can be in at least a one-way communication with the PICC and the at least one communication can include a communication from the at least one signal source to the at least one sensor.

In some embodiments, the ultrasound scanner includes an inertial measurement unit implemented to generate orientation data for the ultrasound scanner. The positional data of the ultrasound scanner can be based on the orientation data, and describes a location of the ultrasound scanner relative to the chest-worn device. Additionally or alternatively, the chest-worn device can include ultrasound-detectable fiducial markers, and the processor system can generate, based on the ultrasound transmitted by the ultrasound scanner and the ultrasound-detectable fiducial devices, orientation data for the ultrasound scanner. The positional data of the ultrasound scanner can be based on the orientation data and describes a location of the ultrasound scanner relative to the chest-worn device.

FIG. 8 illustrates an example method 800 that can be implemented by an ultrasound system according to some embodiments. The ultrasound system can include an ultrasound scanner, a patient-worn registration system, a processor system, and a display device. Operations of the method are performed by processing logic that can comprise hardware (circuitry, dedicated logic, etc.), software (such as is run on a general-purpose computer system or a dedicated machine), firmware, or combinations thereof.

The ultrasound scanner transmits ultrasound at a patient anatomy and generates ultrasound data based on reflections of the ultrasound from the patient anatomy (block 802). The processor system determines, based on the ultrasound data and positional data of the ultrasound scanner, a location of the patient anatomy in a coordinate system (block 804). The processor system determines a location of an interventional instrument in the coordinate system (block 806). The processor system determines, based on the location of the patient anatomy in the coordinate system and the location of the interventional instrument in the coordinate system, a location of the interventional instrument relative to the patient anatomy (block 808). The display device displays a depiction of the patient anatomy based on the ultrasound data and a visual representation of the interventional instrument at the location relative to the patient anatomy (block 810).

In some embodiments, the processor system generates the depiction of the patient anatomy as a three-dimensional (3D) depiction, and the display device displays the 3D depiction and the visual representation of the interventional instrument as part of an augmented reality environment. The patient anatomy can include a cardiac anatomy and the processor system can generate the 3D depiction as a static cardiac depiction that is generated prior to insertion of the interventional instrument into the cardiac anatomy. The interventional instrument can include at least one of a catheter, a pacemaker, and a stent.

In some embodiments, the patient-worn registration system includes a chest-worn patch. The chest-worn patch can be acoustically transparent, and the ultrasound scanner can transmit the ultrasound through the chest-worn patch. Further, the chest-worn patch can include at least one device selected from the group consisting of ECG sensors, defibrillator pads, and the display device. Additionally or alternatively, the chest-worn patch can include a cardiac ultrasound imager configured to generate additional ultrasound data while the interventional instrument is inserted into the patient anatomy, and the display device can display one or more images that depict the insertion.

In some embodiments, the patient-worn registration system includes at least one sensor and the interventional instrument includes at least one signal source. Additionally or alternatively, the patient-worn registration system can include at least one signal source and the interventional instrument includes at least one sensor. The patient-worn registration system can be in at least a one-way communication with the interventional instrument and the at least a one-way communication can include a communication from the at least one signal source to the at least one sensor.

In some embodiments, the ultrasound scanner includes an inertial measurement unit implemented to generate orientation data for the ultrasound scanner. The positional data of the ultrasound scanner can be based on the orientation data, and describes a location of the ultrasound scanner relative to the patient-worn registration system. Additionally or alternatively, the patient-worn registration system can include ultrasound-detectable fiducial markers, and the processor system can generate, based on the ultrasound transmitted by the ultrasound scanner and the ultrasound-detectable fiducial devices, orientation data for the ultrasound scanner. The positional data of the ultrasound scanner can be based on the orientation data and describes a location of the ultrasound scanner relative to the patient-worn registration system.

Example Environment

Figure 9:
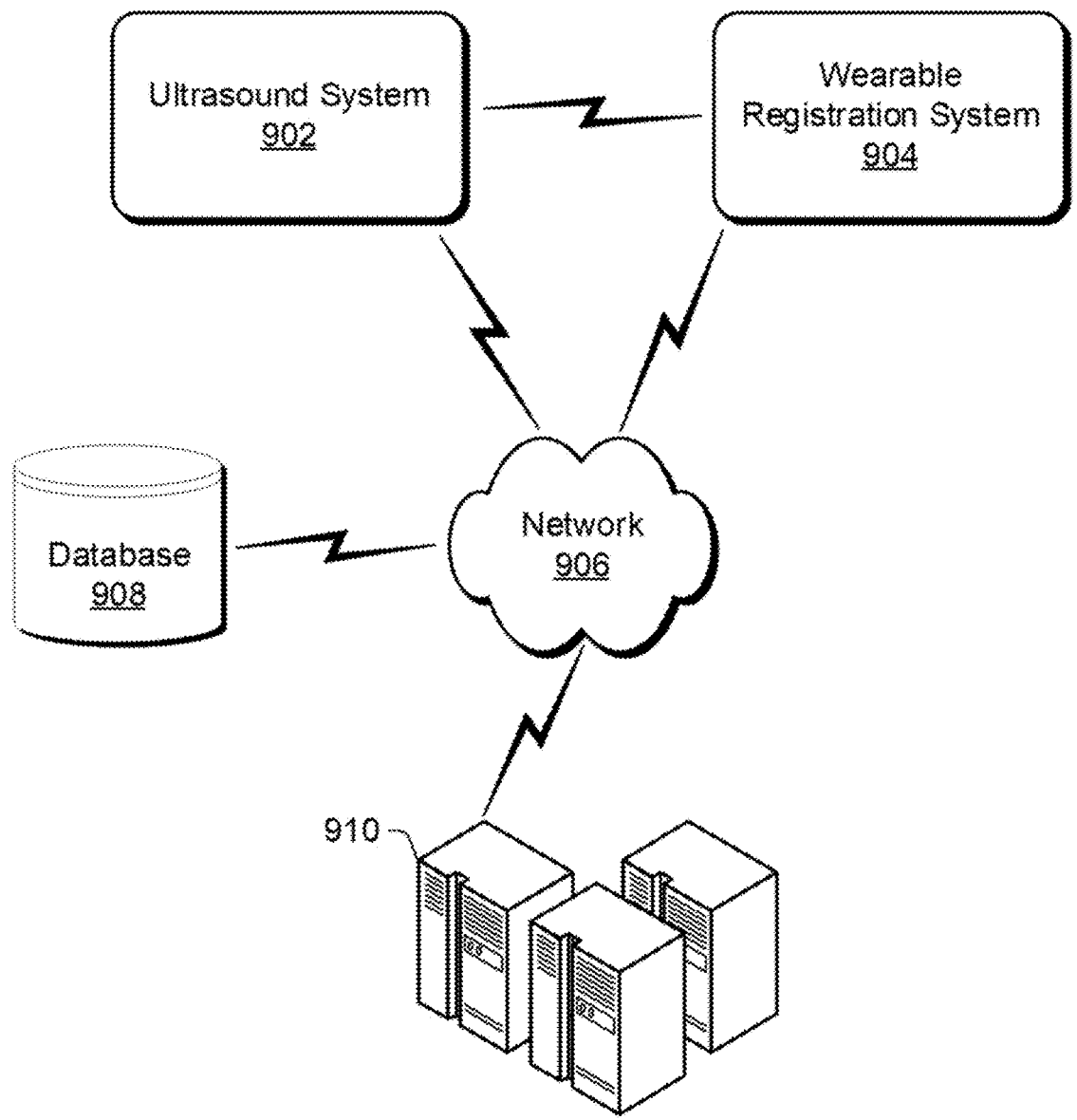
FIG. 9 illustrates an operating environment for an ultrasound system according to some embodiments.

FIG. 9 illustrates an operating environment 900 for an ultrasound system according to some embodiments. The environment 900 includes an ultrasound system 902. Generally, the ultrasound system 902 can include any suitable device (e.g., a component of an ultrasound system). Examples devices of the ultrasound system 902 include a charging station, an ultrasound machine, a display device (e.g., a tablet or smartphone), an ultrasound scanner, and an ultrasound cart. Other examples include a transducer cable, a transducer cable holder, a docking station for an ultrasound machine, a scanner station configured to hold one or more ultrasound scanners, a needle guide, a battery for a wireless ultrasound scanner, a battery for an ultrasound machine, a registration system, and the like.

The environment 900 also includes the wearable registration system 904. The registration systems 104, 302, and 402 previously described are examples of the wearable registration system 904. The ultrasound system 902 and the wearable registration system 904 can be in communication with each other, such as via a near field communication (NFC) link, a network (e.g., a local area network, wide area network, the network 906 (described below in more detail, etc.)), and the like. Further, the ultrasound system 902 and the wearable registration system 904 can be in communication with the network 906.

The network 906 can include any suitable network, such as a local area network, a wide area network, a near field communication network, the Internet, an intranet, an extranet, a system bus that couples devices or device components (e.g., in an ASIC, FPGA, or SOC), and combinations thereof. Accordingly, in embodiments, information can be communicated to the ultrasound system 902 and/or the wearable registration system 904 through the network 906. For instance, the database 908 can store instructions executable by a processor system of the ultrasound system 902 and/or the wearable registration system 904, and communicate the instructions via the network 906.

The environment 900 also includes a server system 910 that can implement any of the functions described herein. The server system 910 can be a separate device from the ultrasound system 902 and the wearable registration system 904. Alternatively, the server system 910 can be included in at least one of the ultrasound system 902 and the wearable registration system 904. In one example, the server system 910 and the database 908 are included in at least one of the ultrasound system 902 and/or the wearable registration system 904. In an example, the server system 910 is implemented as a remote server system that is remote from (e.g., not collocated with) the ultrasound system 902 and the wearable registration system 904. In some embodiments, the registration system for cardiac ultrasound creates a full service PICC team ultrasound system.

Figure 10:
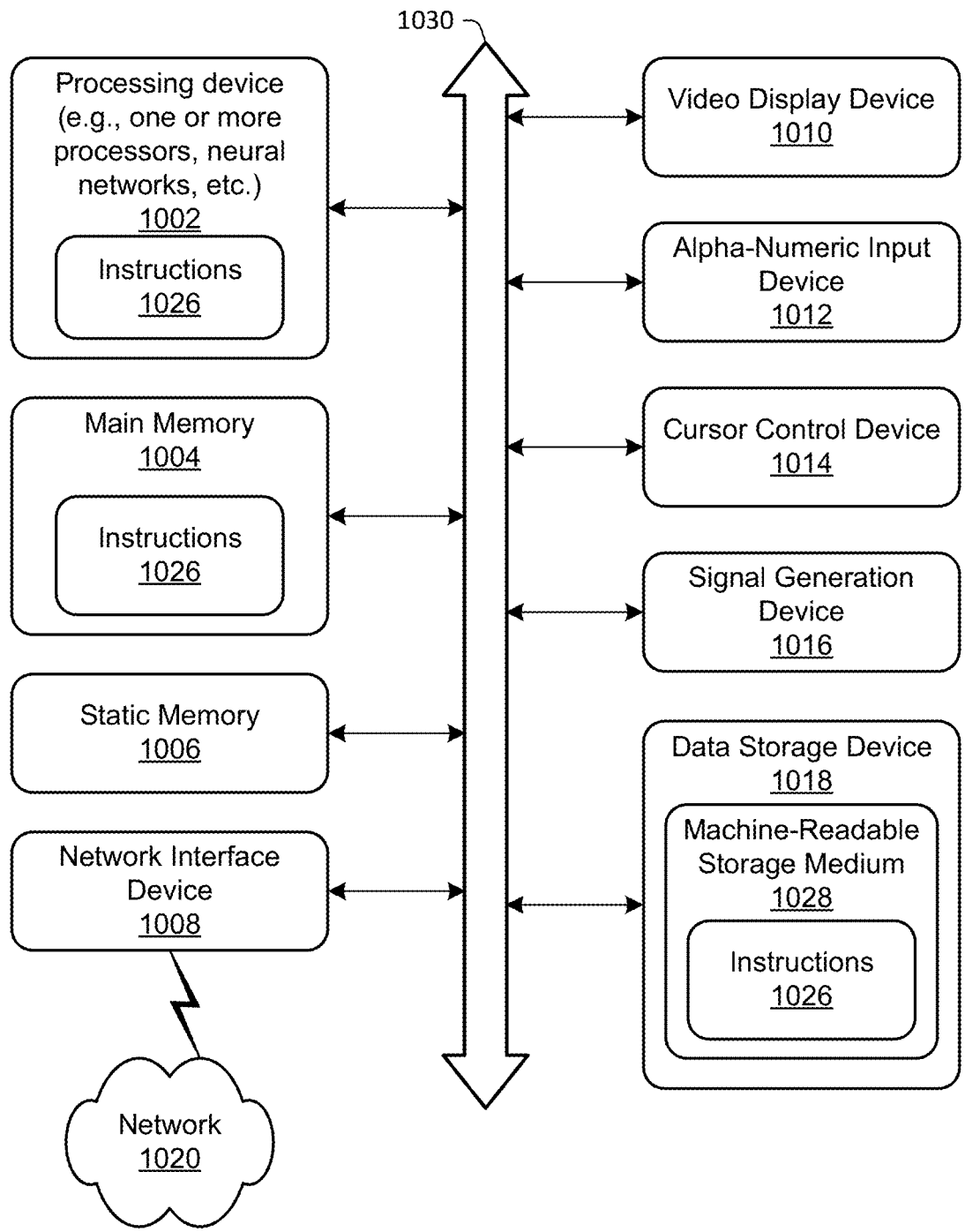
FIG. 10 illustrates a block diagram of an example computing device that can perform one or more of the operations described herein, in accordance with some embodiments.

FIG. 10 illustrates a block diagram of an example computing device 1000 that can perform one or more of the operations described herein, in accordance with some embodiments. Computing device 1000 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a server computing, a desktop computer, a laptop computer, a tablet computer, a smartphone, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods and processes discussed herein. In some embodiments, the computing device 1000 may be one or more of an access point and a packet forwarding component.

The example computing device 1000 may include a processing device (e.g., a general-purpose processor, a PLD, etc.) 1002, a main memory 1004 (e.g., synchronous dynamic random-access memory (DRAM), read-only memory (ROM)), a static memory 1006 (e.g., flash memory and a data storage device 1018), which may communicate with each other via a bus 1030. Processing device 1002 may be provided by one or more general-purpose processing devices such as a microprocessor, central processing unit, or the like. In an illustrative example, processing device 1002 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1002 may also comprise one or more special-purpose processing devices such as an application specific integrated circuit (ASIC), a field programmable gate array (FPGA), a digital signal processor (DSP), network processor, or the like. The processing device 1002 may be configured to execute the operations described herein, in accordance with one or more aspects of the present disclosure, for performing the operations and steps discussed herein.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker, and/or a microphone). In one embodiment, video display unit 1010, alphanumeric input device 1012, and cursor control device 1014 may be combined into a single component or device (e.g., an LCD touch screen).

Data storage device 1018 may include a computer-readable storage medium 1028 on which may be stored one or more sets of instructions 1026, e.g., instructions for carrying out the operations described herein, in accordance with one or more aspects of the present disclosure. For instance, the instructions 1026 can implement the reporting application, as described herein. Instructions 1026 may also reside, completely or at least partially, within main memory 1004 and/or within processing device 1002 during execution thereof by computing device 1000, main memory 1004 and processing device 1002 also constituting computer-readable media. The instructions may further be transmitted or received over a network 1020 via network interface device 1008.

While computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. In some embodiments, the computer-readable storage medium 1028 implements the database of user-defined mappings, as described above. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "transmitting," "determining," "receiving," "generating," "or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general-purpose computing device selectively programmed by a computer program stored in the computing device. Such a computer program may be stored in a computer-readable non-transitory storage medium, such as a storage memory.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Reference in the specification to "one embodiment", "an embodiment", "one example", or "an example" means that a particular feature, structure, or characteristic described in conjunction with the embodiment can be included in at least one embodiment. The appearances of the phrases "in one embodiment" or "in an embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

In the specification, the term "and/or" describes three relationships between objects that may exist. For example, A and/or B may represent the following cases: only A exists, both A and B exist, and only B exist, where A and B may be singular or plural.

The foregoing description, for the purpose of explanation, has been described with reference to specific embodiments. However, the illustrative discussions above are not intended to be exhaustive or to limit embodiments of the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An ultrasound system comprising:
    an ultrasound scanner configured to transmit ultrasound at a patient anatomy and generate ultrasound data based on reflections of the ultrasound from the patient anatomy;
    a patient-worn registration system configured in at least a one-way communication with an interventional instrument; and
    a processor system implemented to:
        determine, based on the ultrasound data and positional data of the ultrasound scanner, a first location of the patient anatomy relative to the patient-worn registration system;
        determine, based on the at least a one-way communication, a second location of the interventional instrument relative to the patient-worn registration system; and
        determine, based on the first location and the second location, a third location of the interventional instrument relative to the patient anatomy; and
    a display device configured to display a depiction of the patient anatomy based on the ultrasound data and a visual representation of the interventional instrument at the third location.

2. The ultrasound system as described in claim 1, wherein the patient-worn registration system includes a chest-worn patch.

3. The ultrasound system as described in claim 2, wherein the chest-worn patch is acoustically transparent and the ultrasound scanner is implemented to transmit the ultrasound through the chest-worn patch.

4. The ultrasound system as described in claim 2, wherein the chest-worn patch includes at least one device selected from the group consisting of ECG sensors, defibrillator pads, and the display device.

5. The ultrasound system as described in claim 2, wherein the chest-worn patch includes a cardiac ultrasound imager configured to generate additional ultrasound data while the interventional instrument is inserted into the patient anatomy, and the display device is implemented to display one or more images that depict the insertion.

6. The ultrasound system as described in claim 1, wherein the patient-worn registration system includes at least one sensor and the interventional instrument includes at least one signal source, and the at least a one-way communication includes a communication from the at least one signal source to the at least one sensor.

7. The ultrasound system as described in claim 1, wherein the patient-worn registration system includes at least one signal source and the interventional instrument includes at least one sensor, and the at least a one-way communication includes a communication from the at least one signal source to the at least one sensor.

8. A method performed by an ultrasound system, the method comprising:
    transmitting, with an ultrasound scanner, ultrasound at a patient anatomy and generating ultrasound data based on reflections of the ultrasound from the patient anatomy;
    determining, using with a processor system, based on the ultrasound data and positional data of the ultrasound scanner, a first location of the patient anatomy relative to a patient-worn registration system configured in at least a one-way communication with an interventional instrument;

determining, based on the at least a one-way communication, a second location of the interventional instrument relative to the patient-worn registration system;

determining, based on the first location and the second location, a third location of the interventional instrument relative to the patient anatomy; and displaying a depiction of the patient anatomy based on the ultrasound data and a visual representation of the interventional instrument at the third location.

9. The method as described in claim 8, wherein the patient-worn registration system includes a chest-worn patch.

10. The method as described in claim 9, wherein the chest-worn patch is acoustically transparent and the ultrasound scanner is implemented to transmit the ultrasound through the chest-worn patch.

11. The method as described in claim 9, wherein the chest-worn patch includes at least one device selected from the group consisting of ECG sensors, defibrillator pads, and the display device.

12. The method as described in claim 9, wherein the chest-worn patch includes a cardiac ultrasound imager configured to generate additional ultrasound data while the interventional instrument is inserted into the patient anatomy, and the display device is implemented to display one or more images that depict the insertion.

13. The method as described in claim 8, wherein the patient-worn registration system includes at least one sensor and the interventional instrument includes at least one signal source, and the at least a one-way communication includes a communication from the at least one signal source to the at least one sensor.

14. The method as described in claim 8, wherein the patient-worn registration system includes at least one signal source and the interventional instrument includes at least one sensor, and the at least a one-way communication includes a communication from the at least one signal source to the at least one sensor.

* * * * *